US009295122B2

(12) United States Patent
Matsushita et al.

(10) Patent No.: US 9,295,122 B2
(45) Date of Patent: Mar. 22, 2016

(54) LIGHT SOURCE CONTROL DEVICE AND GAME MACHINE

(71) Applicant: OMRON Corporation, Kyoto-shi, Kyoto (JP)

(72) Inventors: Katsumi Matsushita, Gifu (JP); Hiroyuki Ibuki, Aichi (JP); Yasuyuki Ooba, Aichi (JP); Norihisa Takahashi, San Ramon, CA (US)

(73) Assignee: OMRON Corporation, Kyoto (JP)

( * ) Notice: Subject to any disclaimer, the term of this patent is extended or adjusted under 35 U.S.C. 154(b) by 107 days.

(21) Appl. No.: 14/363,044

(22) PCT Filed: Nov. 21, 2012

(86) PCT No.: PCT/JP2012/080193
§ 371 (c)(1),
(2) Date: Jun. 5, 2014

(87) PCT Pub. No.: WO2013/088930
PCT Pub. Date: Jun. 20, 2013

(65) Prior Publication Data

US 2014/0364219 A1 Dec. 11, 2014

(30) Foreign Application Priority Data

Dec. 12, 2011 (JP) ................................ 2011-271507
Dec. 12, 2011 (JP) ................................ 2011-271513

(51) Int. Cl.
*A63F 9/24* (2006.01)
*H05B 33/08* (2006.01)
(Continued)

(52) U.S. Cl.
CPC .............. *H05B 33/0821* (2013.01); *A63F 9/24* (2013.01); *G07F 17/3211* (2013.01);
(Continued)

(58) Field of Classification Search
CPC .. A63F 11/0051; G07F 17/3202; H05B 37/02
See application file for complete search history.

(56) References Cited

U.S. PATENT DOCUMENTS 6,292,901 B1 * 9/2001 Lys ...................... A61N 5/0616 713/300
8,841,864 B2 * 9/2014 Maxik ................ H05B 33/0863 315/294

(Continued)

FOREIGN PATENT DOCUMENTS

JP 2001-252400 A 9/2001
JP 2003-220235 A 8/2003

(Continued)

OTHER PUBLICATIONS

Examination Report issued in corresponding Japanese Application No. 2011-271513, mailed on Aug. 25, 2015 (24 pages).

(Continued)

*Primary Examiner* — Reginald Renwick
(74) *Attorney, Agent, or Firm* — Osha Liang LLP

(57) ABSTRACT

A light source control device configured to control a plurality of light sources provided in a game machine, an anode of each of the plurality of light sources being connected to one of at least one first signal wire, a cathode being connected to one of a plurality of second signal wires, the light sources differing from each other in a set of the connected first signal wire and second signal wire, has a plurality of first output pins, a plurality of second output pins, an interface, a storage, a dynamic controller, a period-setting unit, and a gradation controller. Each of the plurality of first output pins is provided in corresponding one of the at least one first signal wire. The plurality of first output pins connect to a drive circuit that switches whether power is supplied to the first signal wire.

5 Claims, 7 Drawing Sheets

(51) Int. Cl.
*G07F 17/32* (2006.01)
*H05B 37/02* (2006.01)

(52) U.S. Cl.
CPC ......... *H05B 33/086* (2013.01); *H05B 33/0818* (2013.01); *H05B 37/0281* (2013.01); *H05B 33/0824* (2013.01); *Y02B 20/346* (2013.01)

(56) References Cited

U.S. PATENT DOCUMENTS

2004/0052076 A1* 3/2004 Mueller ............. F21V 23/0442 362/293
2009/0029770 A1* 1/2009 Nagano .................... G01D 7/04 463/31

FOREIGN PATENT DOCUMENTS

JP 2004-344525 A 12/2004
JP 2007-244666 A 9/2007
JP 2007-244799 A 9/2007

OTHER PUBLICATIONS

Examination Report issued in corresponding Japanese Application No. 2011-271507, mailed on Aug. 25, 2015 (23 pages).

* cited by examiner

| | Operation mode | | | | | | | | | | | | | | |
|---|---|---|---|---|---|---|---|---|---|---|---|---|---|---|---|
| | Static (24x1) | Dynamic 1 (24x2) | | Dynamic 2 (24x4) | | | | Dynamic 3 (12x8) | | | | | | | |
| Output pin | OUTC1 | OUTC1 | OUTC2 | OUTC1 | OUTC2 | OUTC3 | OUTC4 | OUTC1 | OUTC2 | OUTC3 | OUTC4 | OUTU1 | OUTU2 | OUTU3 | OUTU4 |
| OUTS1 | Group #0 | Group #0 | Group #2 | Group #0 | Group #2 | Group #4 | Group #6 | Group #0 | Group #1 | Group #2 | Group #3 | Group #4 | Group #5 | Group #6 | Group #7 |
| OUTS2 | | | | | | | | | | | | | | | |
| OUTS3 | | | | | | | | | | | | | | | |
| OUTS4 | | | | | | | | | | | | | | | |
| OUTS5 | | | | | | | | | | | | | | | |
| OUTS6 | | | | | | | | | | | | | | | |
| OUTS7 | | | | | | | | | | | | | | | |
| OUTS8 | | | | | | | | | | | | | | | |
| OUTS9 | | | | | | | | | | | | | | | |
| OUTS10 | | | | | | | | | | | | | | | |
| OUTS11 | | | | | | | | | | | | | | | |
| OUTS12 | | | | | | | | | | | | | | | |
| OUTS13 | Group #1 | Group #1 | Group #3 | Group #1 | Group #3 | Group #5 | Group #7 | | | | | | | | |
| OUTS14 | | | | | | | | | | | | | | | |
| OUTS15 | | | | | | | | | | | | | | | |
| OUTS16 | | | | | | | | | | | | | | | |
| OUTS17 | | | | | | | | | | | | | | | |
| OUTS18 | | | | | | | | | | | | | | | |
| OUTS19 | | | | | | | | | | | | | | | |
| OUTS20 | | | | | | | | | | | | | | | |
| OUTU1 | | | | | | | | | | | | | | | |
| OUTU2 | | | | | | | | | | | | | | | |
| OUTU3 | | | | | | | | | | | | | | | |
| OUTU4 | | | | | | | | | | | | | | | |

LIGHT SOURCE CONTROL DEVICE AND GAME MACHINE

BACKGROUND

1. Technical Field

The present invention relates to a light source control device controlling a plurality of light sources and a game machine including the light source control device.

2. Related Art

In game machines such as a slot machine and a pachinko machine, various ideas for giving performances appealing to a visual sense, a hearing sense, or a feeling of a player are introduced in order to attract interest of the player. Particularly, many light sources are provided in the game machine in order to give the performance appealing the visual sense of the player. For example, a light emitting diode (LED) is used as the light source. Use of a combination of the red, blue, and green LEDs gives such a performance that an emission color is changed in various ways.

Sometimes several hundred LEDs are arranged in a front surface of the game machine in order to enhance a performance effect. Emission luminance or an emission period of each of the LEDs is adjusted according to the performance, which allows an emission state of the front surface of the game machine to be changed in a widely varying manner.

However, with increasing number of LEDs mounted on the game machine, the number of wires used to drive the LEDs is increased and the number of terminals, which are provided in a performance processor unit to output signals controlling the LEDs, is also increased. When the number of wires is increased, the wire is hardly installed in a rear surface of the game machine and cost of the performance processor unit is also increased.

Sometimes a light source control device, which is placed between the performance processor unit and each LED to control an emission intensity and emission timing of the LED, is mounted on the game machine in order to decrease the number of wires and the number of terminals of the performance processor unit (for example, see Japanese Unexamined Patent Publication No. 2003-24523).

In the game machine disclosed in Japanese Unexamined Patent Publication No. 2003-24523, the plurality of LEDs are controlled by a dynamic control system using a lighting control circuit corresponding to the light source control device. In the dynamic control system, each LED is connected to one of a plurality of selection wires. In each predetermined cycle, a constant-voltage source sequentially supplies power to only one of the plurality of selection wires for a given period. Therefore, in the dynamic control system, the plurality of LEDs connected to the different selection wires can be lit and turned off by controlling one switching circuit.

SUMMARY

On the other hand, a static control system is well known as a system to control the many LEDs. In the static control system, the constant-voltage source always supplies the power to the selection wire connected to the plurality of LEDs that are of control targets, and the switching circuit that turns on and off the LED is provided for each LED. The static control system has an advantage that an emission amount per unit time of each LED can be increased compared with the dynamic control system. At the same time, disadvantageously the number of wires and power consumption are increased.

Therefore, in the LEDs attached to an identical game machine, depending on the arrangement of the LEDs and the like, sometimes the LEDs according to one or more embodiments of the present invention are controlled by the static control system and sometimes the LEDs according to one or more embodiments of the present invention are controlled by the dynamic control system. For example, the pachinko machine has LEDs attached to a game board and LEDs attached to a game frame supporting the game board. Devices such as a display and a movable accessory which are controlled by a main control circuit or a performance control circuit are usually attached to the game board in addition to the LED. Therefore, in the game board, according to one or more embodiments of the present invention, the number of wires is decreased with respect to the LED attached to the game board because there is a restriction to a space where the wiring of the LED can be placed. Accordingly, the dynamic control system is suitable for the control of the LED attached to the game board. On the other hand, in the game frame, sometimes a plurality of LED groups are arranged while separated from each other. The relatively small number of LEDs is included in one LED group because the game frame has a narrow width. Therefore, according to one or more embodiments of the present invention, the individual LED has the high emission amount. Accordingly, according to one or more embodiments of the present invention, the LED attached to the game frame is controlled by the light source control device which is operated by the static control system and arranged near a place where the individual LED group is arranged.

In the case that both the light source control device of the dynamic control system and the light source control device of the static control system are used in the identical game machine as described above, sometimes a system of commands controlling the light source control device varies in each of light source control devices having different control systems. Therefore, because it is necessary for the performance control circuit to generate the command in each light source control device according to each command system, design of the performance control circuit becomes complicated, and there is a risk of increasing a calculation load on the performance control circuit during the control of the LED.

A light source control device according to one or more embodiments of the present invention can control the plurality of light sources in both the static control system and the dynamic control system and a game machine provided with the light source control device.

In accordance with one or more embodiments of the present invention, a light source control device is provided configured to control a plurality of light sources provided in a game machine. An anode of each of the plurality of light sources to be controlled by the light source control device is connected to one of at least one first signal wire, a cathode is connected to one of a plurality of second signal wires, and the light sources differs from each other in a set of the connected first signal wire and second signal wire. The light source control device includes: a plurality of first output pins each of which is provided in corresponding one of the at least one first signal wire, the plurality of first output pins configured to connect to a drive circuit configured to switch whether power is supplied to the first signal wire; a plurality of second output pins configured to connect with one of the plurality of second signal wires; an interface that includes gradation data for each of the plurality of light sources, the gradation data specifying an emission amount of one of the plurality of light sources using a plurality of bits, the interface configured to receive a serially-transmitted control command and an operation mode signal designating an operation mode applied in a plurality of operation modes, the operation modes differing from each other in a combination of the number of first signal wires and the number of second signal wires; a dynamic controller configured to decide a first period such that the first signal wires differ from each other in timing of supplying the power according to the number of first signal wires used in the operation mode designated by the operation mode signal, the dynamic controller configured to output a signal to each first output pin connected to the drive circuit in the plurality of first output pins, the signal causing each first output pin to supply the power to the first signal wire during the first period, the drive circuit being connected to the first signal wire used in the designated operation mode; a period-setting unit configured to set a second period to each of the plurality of second signal wires used in the designated operation mode, the second period during which the light source is able to be energized according to the emission amount expressed in the gradation data corresponding to the light source while the first period is set to the first signal wire to which the anode of the light source is connected, the anode of the light source being connected to the second signal wire in the plurality of light sources; and a gradation controller that is connected to the plurality of second output pins, the gradation controller configured to energize the light source during the second period of the light source connected to the second signal wire in the plurality of light sources with respect to each second output pins connected to the second signal wire used in the designated operation mode.

According to one or more embodiments of the present invention, the light source control device further includes an output switching circuit configured to connect at least one of the plurality of second output pins to one of the gradation controller and the dynamic controller according to the operation mode signal.

According to one or more embodiments of the present invention, the light source control device further includes a data selector configured to group a plurality of storage areas into groups each comprised of storage areas of the greatest common factor of the number of second signal wires specified by the plurality of operation modes, the data selector configured to read the gradation data from the storage area included in the group and transmit the gradation data to the period-setting unit in each group corresponding to the operation mode designated in the operation mode signal. In the light source control device, the storage according to one or more embodiments of the present invention includes the storage areas as many as a maximum value of the number of controllable light sources, each of the storage areas configured to store one piece of the gradation data.

In accordance with one or more embodiments of the present invention, a game machine is provided including: a game machine body; a plurality of light sources that are arranged in a front surface of the game machine body; a light source control device configured to control the plurality of light sources; and a performance controller configured to control performance according to a state of a game. In the game machine, an anode of each of the plurality of light sources is connected to one of at least one first signal wire, a cathode is connected to one of a plurality of second signal wires, and the light sources differs from each other in a set of the connected first signal wire and second signal wire. The performance controller generates a control command according to the state of the game, the control command including gradation data for each of the plurality of light sources, the gradation data specifying an emission amount of one of the plurality of light sources using a plurality of bits, and the performance controller serially transmits the control command to the light source control device. The performance controller also transmits an operation mode signal to the light source control device, the operation mode signal designating an applied operation mode from a plurality of operation modes that differ from each other in a combination of the number of first signal wires and the number of second signal wires. The light source control device includes: a plurality of first output pins each of which is provided in corresponding one of the at least one first signal wire, the plurality of first output pins configured to connect to a drive circuit configured to switch whether power is supplied to the first signal wire; a plurality of second output pins configured to connect with one of the plurality of second signal wires; an interface configured to receive the control command and the operation mode signal; a dynamic controller configured to decide a first period such that the first signal wires differ from each other in timing of supplying the power according to the number of first signal wires used in the operation mode designated by the operation mode signal, the dynamic controller configured to output a signal to each first output pin connected to the drive circuit in the plurality of first output pins, the signal causing each first output pin to supply the power to the first signal wire during the first period, the drive circuit being connected to the first signal wire used in the designated operation mode; a period-setting unit configured to set a second period to each of the plurality of second signal wires used in the designated operation mode, the second period during which the light source is able to be energized according to the emission amount expressed in the gradation data corresponding to the light source while the first period is set to the first signal wire to which the anode of the light source is connected, the anode of the light source being connected to the second signal wire in the plurality of light sources; and a gradation controller that is connected to the plurality of second output pins, the gradation controller configured to energize the light source during the second period of the light source connected to the second signal wire in the plurality of light sources with respect to each second output pins connected to the second signal wire used in the designated operation mode.

A light source control device and game machine according to one or more embodiments of the present invention can control the plurality of light sources in both the static control system and the dynamic control system.

BRIEF DESCRIPTION OF THE DRAWINGS

FIG. 4 is a diagram illustrating an example of a relationship between an operation mode and a register group.

DETAILED DESCRIPTION

Hereinafter, embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The light source control device decides a period during which power is supplied to each selection wire and timing according to an operation mode designated by a superior control device, such as a performance control circuit, from a plurality of operation modes each of which specifies the number of selection wires (first signal wires) used and the number of control wires (second signal wires). The light source control device also decides a period during which the control wire to which each light source is connected can be energized and timing from gradation data expressing an emission amount of each light source, the emission amount being specified by the same rule with respect to either a static control system (that is, one selection wire is used) or a dynamic control system (that is, a plurality of selection wires are used) according to the period during which the power is supplied to each selection wire and the timing. Therefore, the light source control device can control a plurality of LEDs by either the static control system or the dynamic control system using a command including the gradation data for each light source according to the same command system.

The light source control device of one or more embodiments of the present invention includes a static mode in which the LEDs of up to 24 systems are driven by the static control system and three kinds of dynamic modes 1 to 3 in which the LEDs are controlled by the dynamic control system, as the operation modes. In dynamic mode 1, the light source control device controls the LEDs of up to 48 systems using the 24 control wires and the 2 selection wires. In dynamic mode 2, the light source control device controls the LEDs of up to 96 systems using the 24 control wires and the 4 selection wires. In dynamic mode 3, the light source control device controls the LEDs of up to 96 systems using the 12 control wires and the 8 selection wires. In each operation mode, the light source control device controls the emission amounts of the plurality of LEDs by a pulse width modulation (PWM) system.

Figure 1A:
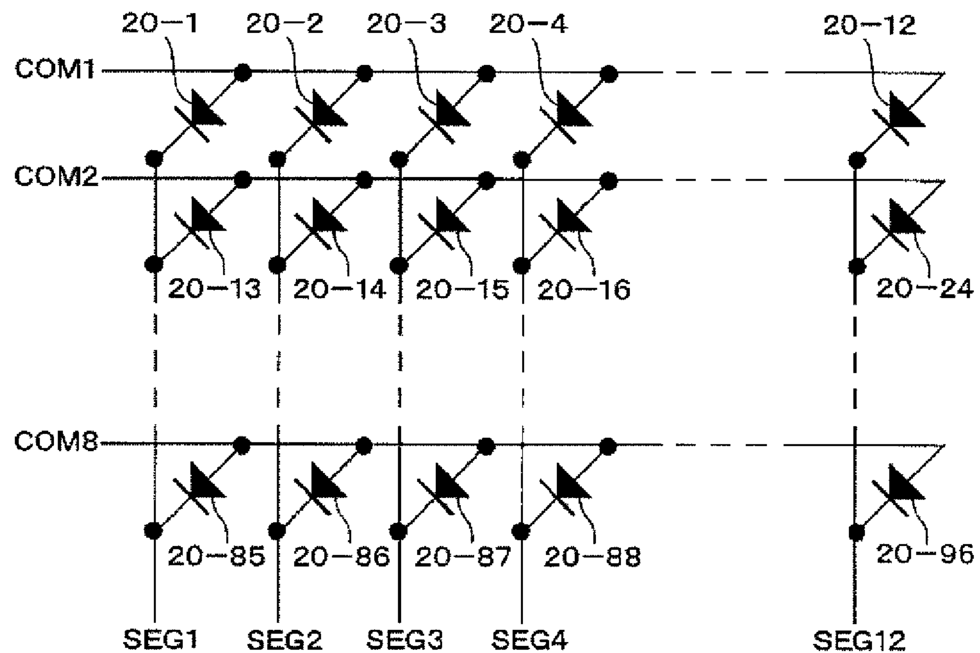
FIG. 1A is a wiring diagram illustrating an example of each LED controlled by a light source control device according to one or more embodiments of the present invention.
Figure 1B:
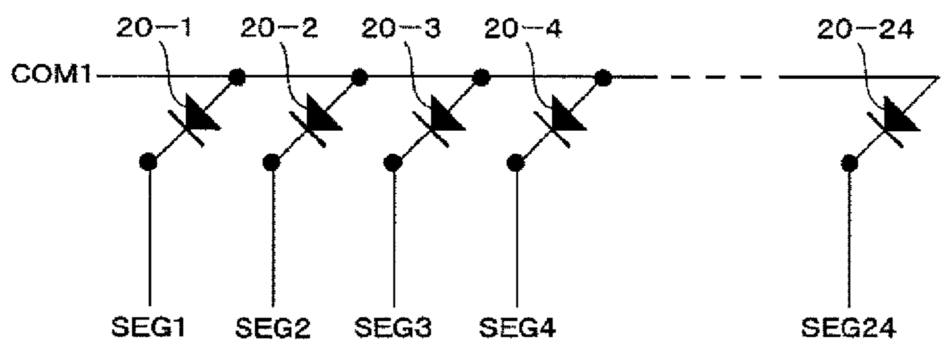
FIG. 1B is a wiring diagram illustrating another example of each LED controlled by the light source control device according to one or more embodiments of the present invention.

FIGS. 1A and 1B are wiring diagrams illustrating examples of the LEDs driven by the light source control device of one or more embodiments of the present invention. In FIG. 1A, LEDs 20-1 to 20-96 of 96 systems that are of the light sources are controlled in dynamic mode 3, and connected to 8 selection wires COM1 to COM8 and 12 control wires SEG1 to SEG12 in a two-dimensional matrix form. That is, an anode of each LED is connected to selection wire COMm in each 12 LEDs 20-(12(m−1)+1) to 20-(12(m−1)+12) (m=1, 2, . . . , 8). Cathodes of 8 LEDs 20-(12k+n) located in an nth column from the left are connected to control wire SEGn (k=0, 1, 2, . . . , 7, and n=1, 2, . . . , 12).

Each of selection wires COM1 to COM8 is connected to a constant-voltage source through an LED drive circuit. Each of control wires SEG1 to SEG12 is connected to one of output pins included in the light source control device of one or more embodiments of the present invention that is described later.

Each of LEDs 20-1 to 20-96 may include a plurality of LEDs connected in series or parallel. Actually, LEDs 20-1 to 20-96 may not be arranged in the two-dimensional matrix form, but decided according to a shape of a game board on which the LEDs are arranged or a positional relationship with a performance member, such as an accessory unit, which is provided on the game board.

In FIG. 1B, LEDs 20-1 to 20-24 of 24 systems that are of the light sources are controlled in the static mode. In this case, the cathode of each LED is connected to 24 control wires SEG1 to SEG24, and anode of each LED is connected to one selection wire COM1 connected to the constant-voltage source.

In the example of FIG. 1B, each of control wires SEG1 to SEG24 is connected to the light source control device of one or more embodiments of the present invention that is described later. Each of LEDs 20-1 to 20-24 may also include a plurality of LEDs connected in series or parallel.

Figure 2:
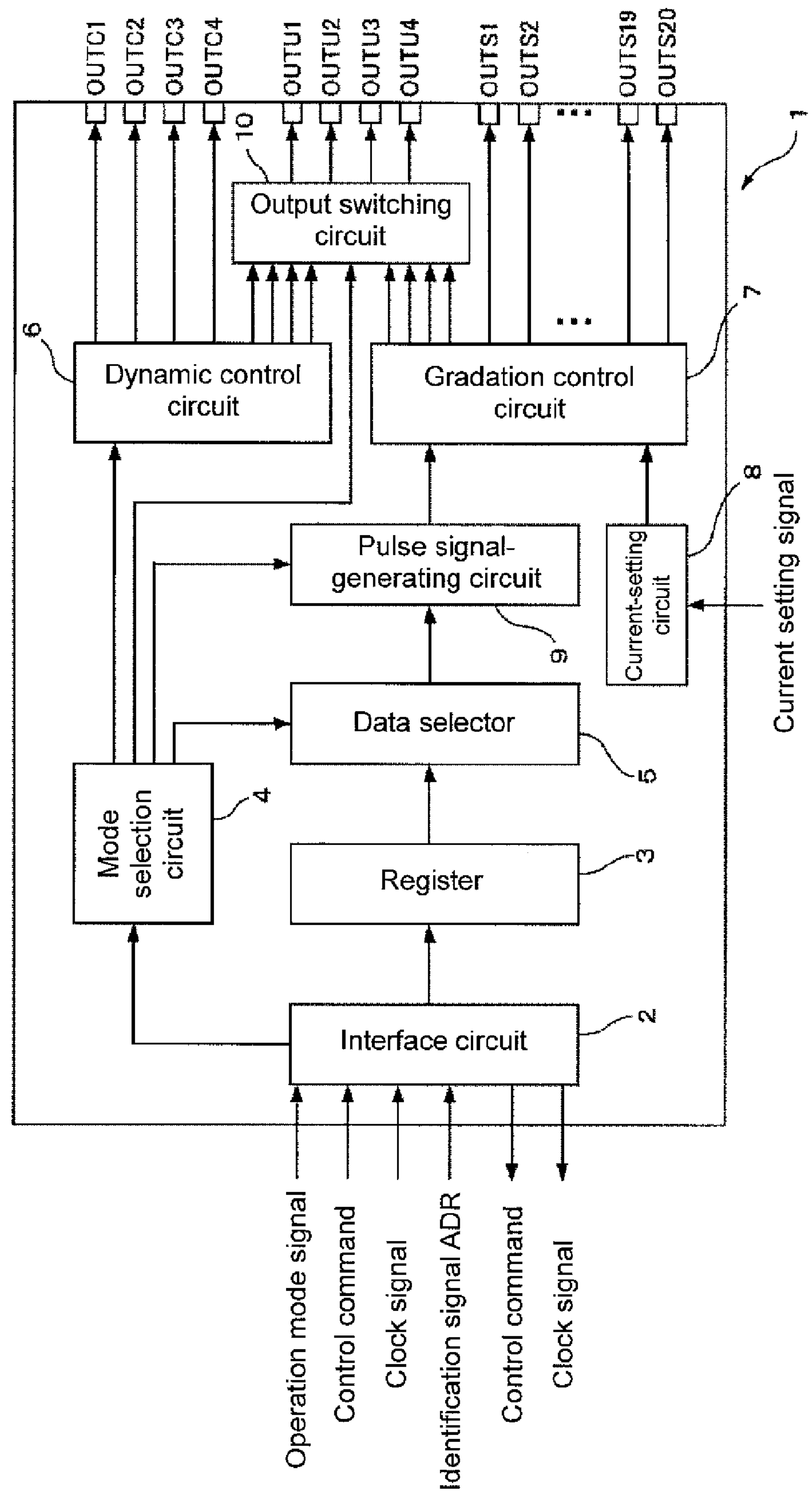
FIG. 2 is a schematic configuration diagram illustrating the light source control device according to one or more embodiments of the present invention.

FIG. 2 is a schematic configuration diagram illustrating the light source control device of one or more embodiments of the present invention. As illustrated in FIG. 2, light source control device 1 includes interface circuit 2, register 3, mode selection circuit 4, data selector 5, dynamic control circuit 6, gradation control circuit 7, current-setting circuit 8, pulse signal-generating circuit 9, and output switching circuit 10.

The units included in light source control device 1 may be mounted on a circuit board (not illustrated) as individual circuits, or mounted on the circuit board as an integrated circuit in which the units are integrated.

Light source control device 1 includes 4 output pins OUTC1 to OUTC4 and 20 output pins OUTS1 to OUTS20 connected to the control wires. In the case that light source control device 1 operates in the dynamic control system, 4 output pins OUTC1 to OUTC4 are provided in each selection wire, and connected between the constant-voltage source and the selection wire, and 4 output pins OUTC1 to OUTC4 output a pulse signal to the LED drive circuit that alternately supplies the power to the selection wires from the constant-voltage source under the control of dynamic control circuit 6. Furthermore, light source control device 1 includes 4 shared pins OUTU1 to OUTU4 that are output pins connectable to any of the control wires and the LED drive circuit to be connected to the selection wire according to the operation mode. Therefore, in light source control device 1, the use of the shared pins enables light source control device 1 to be selectively operated in one of the plurality of operation modes, which suppresses an increase of the number of output pins.

For example, interface circuit 2 is one that connects light source control device 1 and a processor unit (not illustrated, hereinafter simply referred to as a performance CPU) for performance of a game machine on which light source control device 1 is mounted. Interface circuit 2 receives a control command having a plurality of serially transmitted bits and a clock signal from the performance CPU. In order to analyze the control command, the clock signal is used to be synchronized with each of the plurality of bits included in the control command. For example, the clock signal has a rectangular pulse in each predetermined number of bits in the control command.

Interface circuit 2 also receives identification signal ADR from the performance CPU in order to identify the light source control device serving as a control target of the control command.

Figure 3:
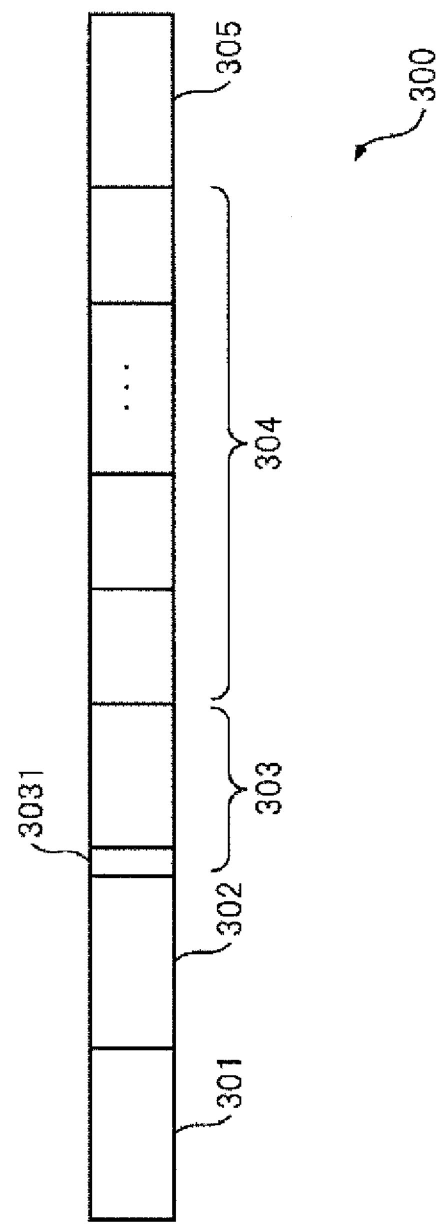
FIG. 3 is a diagram illustrating an example of a control command format.

FIG. 3 is a diagram illustrating an example of a control command format. Control command 300 includes start flag 301, device address 302, control data 303, a plurality of pieces of gradation data 304, and end flag 305 in order from the head. For example, control command 300 may also include a 1-bit spacer having a value of '0' between adjacent flags, addresses, and pieces of data.

Start flag 301 is a bit string expressing the head of control command 300. In one or more embodiments of the present invention, start flag 301 is the bit string in which 9 bits having the value of '1' continue. Start flag 301 may be the bit string that is not matched with any bit strings in control command 300.

Device address 302 is identification information identifying the light source control device serving as the control target of control command 300. In one or more embodiments of the present invention, device address 302 is expressed by the bit string having 7-bit length. Interface circuit 2 determines whether device address 302 is matched with identification signal ADR. When device address 302 is matched with identification signal ADR, light source control device 1 is determined to be the control target of control command 300.

Control data 303 includes 1-bit gradation control bit 3031 that defines the bit length of each piece of gradation data 304 expressing the emission amount of each LED controlled by light source control device 1. Each gradation data 304 is expressed by 8 bits when gradation control bit 3031 is '0', and each gradation data 304 is expressed by 4 bits when gradation control bit 3031 is '1'. The finer emission amount of each LED can be set with increasing number of bits of the gradation data. On the other hand, when the number of bits of the gradation data is decreased, the control command is reduced to shorten a time necessary to transfer the control command, so that the emission amount of each LED can be switched in a short cycle. In addition, a load on the performance CPU is reduced by shortening the control command.

Control data 303 may also include the number of pieces of gradation data that specifies the number of pieces of gradation data 304 included in the control command. Therefore, the control command can be reduced in the case that light source control device 1 controls the LEDs not as many as the maximum number of LEDs that can simultaneously be controlled by light source control device 1.

Each of a plurality of pieces of gradation data 304 expresses the emission amount of the LED connected to light source control device 1. In the case that gradation data 304 is expressed by 4 bits, the emission amount of each LED is expressed by 16 levels because gradation data 304 takes the values of '0' to '15'. On the other hand, in the case that gradation data 304 is expressed by 8 bits, the emission amount of each LED is expressed by 256 levels because gradation data 304 takes the values of '0' to '255'. The emission amount of the corresponding LED is increased with increasing value of gradation data 304. For example, in the case that gradation data 304 is expressed by 4 bits, the emission amount of the corresponding LED becomes the maximum when gradation data 304 has the values of '15' (that is, all the bits are '1'), the emission amount of the corresponding LED becomes a half of the maximum intensity when gradation data 304 has the values of '7', and the corresponding LED becomes a turn-off state when gradation data 304 has the values of '0'. Similarly, in the case that gradation data 304 is expressed by 8 bits, the emission amount of the corresponding LED becomes the maximum when gradation data 304 has the values of '255' (that is, all the bits are '1'), and the corresponding LED becomes the turn-off state when gradation data 304 has the values of '0'.

In the applied operation mode, the order of each gradation data 304 from the head is fixed according to a position on the wiring of the LED connected to light source control device 1. For example, in the case that the applied operation mode is dynamic mode 3, ith (i=0 to 95) gradation data 304 from the head corresponds to the LED connected to selection wire COM (i/12+1) and control wire SEG (i %12+1). An operator % means a remainder operator. In the case that the applied operation mode is dynamic mode 1 or 2, ith (i=0 to m, m=47 in dynamic mode 1, and m=95 in dynamic mode 2) gradation data 304 from the head corresponds to the LED connected to selection wire COM (i24+1) and control wire SEG (i %24+1). In the case that the applied operation mode is the static mode, jth (j=1 to 24) gradation data 304 from the head corresponds to the LED connected to control wire SEGj.

The order of each gradation data 304 from the head may correspond to another array of the LEDs.

End flag 305 is the bit string expressing a termination of control command 300. End flag 305 may be the bit string that is not matched with the start flag and other data bit strings included in control command 300.

For example, when receiving the control command, interface circuit 2 detects the bit string matched with a template having the same bit string as the start flag in the control command, and sets the detected bit string to the start flag. Interface circuit 2 extracts the device address from the control command according to the control command format.

Interface circuit 2 discards the control command unless the device address is matched with identification information ADR. On the other hand, when the device address is matched with identification information ADR, interface circuit 2 extracts the control data from the control command according to the control command format, and checks the bit length of each piece of gradation data by referring to the gradation control bit included in the control data. Interface circuit 2 extracts the gradation data for each LED by separating a portion in which the gradation data of the control command is stored using the number of bits specified by the gradation control bit, and interface circuit 2 stores the gradation data in register 3. In the case that the gradation data is expressed by the 4-bit length, interface circuit 2 may shift the original gradation data onto the left side by 4 bits (that is, 16 times) while expanding the gradation data to the 8-bit length. Therefore, without considering the setting of the bit length of the gradation data in the control command, pulse signal-generating circuit 9 described later can generate the signal output to gradation control circuit 7.

Interface circuit 2 receives an operation mode signal specifying the operation mode applied to light source control device 1 from the performance CPU, and transfers the operation mode signal to mode selection circuit 4. For example, the operation mode signal is expressed by 2 bits, and the values of '00', '01', '10', and '11' indicate the application of the static mode, the application of dynamic mode 1, the application of dynamic mode 2, and the application of dynamic mode 3, respectively. In the case that a plurality of light source control devices 1 are cascaded to one another, interface circuit 2 transfers the received control command and dock signal to another light source control device of a next stage.

Register 3 is an example of the storage. For example, register 3 includes a volatile, writable semiconductor memory circuit. The gradation data of each LED is stored in register 3, the gradation data being included in the control command received by light source control device 1. Register 3 retains the gradation data included in the previous control command until interface circuit 2 receives the new control command to rewrite the gradation data included in the previous control command using the gradation data included in the new control command. Accordingly, until light source control device 1 receives the new control command, an emission pattern of each LED controlled by light source control device 1 is maintained in the emission pattern specified by the previous control command.

In one or more embodiments of the present invention, register 3 includes 96 storage areas in each of which one piece of gradation data can be stored because light source control device 1 controls the LEDs of up to 96 systems. In any applied operation mode, register 3 stores the gradation data for each LED system in the previously fixed storage area of the 96 storage areas according to the order in the control command.

Mode selection circuit 4 decides the operation mode applied to light source control device 1 in response to the operation mode signal received from the performance CPU through interface circuit 2. Mode selection circuit 4 outputs a signal indicating the applied operation mode to data selector 5, dynamic control circuit 6, pulse signal-generating circuit 9, and output switching circuit 10.

According to the operation mode of which data selector 5 is notified by mode selection circuit 4, data selector 5 selects the storage area to be accessed in the plurality of storage areas included in register 3, and reads the operation mode stored in the selected storage area.

In one or more embodiments of the present invention, data selector 5 groups the plurality of storage areas included in register 3 into groups each including storage areas of the greatest common factor of the number of control wires used in each operation mode. For example, in one or more embodiments of the present invention, because the greatest common factor of the number of control wires is 12, the 12 storage areas are grouped into one. Data selector 5 includes multi-input one-output data selector circuits as many as the number of storage areas included in one group, namely, the greatest common factor so as to be able to access the storage area belonging to the same group in parallel. The number of inputs of each data selector circuit can be set to the number in which the total of storage areas included in register 3 is divided by the number of groups. In one or more embodiments of the present invention, register 3 includes 96 storage areas and one group includes 12 storage areas. Therefore, each data selector circuit includes 8 inputs.

Data selector 5 decides the group to be accessed according to the operation mode, and reads the gradation data in parallel from the storage areas included in the group in each group to be accessed. Regardless which operation mode may be applied, data selector 5 can equalize the number of accesses to register 3 of individual data selector circuit and suppress the number of accesses. Therefore, the access to register 3 can efficiently be performed while a circuit scale of data selector 5 is suppressed.

FIG. 4 is a diagram illustrating an example of a relationship between the operation mode and a register group. Referring to FIG. 4, the operation mode is indicated in row 401 at an upper end, and an identification number of the output pin connected to the selection wire that is used in the operation mode indicated in row 401 is indicated in row 402 below row 401. The group of register 3 accessed by data selector 5 is indicated below row 402 according to each selection wire. The identification number of the output pin connected to the control wire corresponding to the gradation data stored in the storage area included in each group is indicated in row 403 at a left end.

In the static mode, data selector 5 reads the gradation data from each storage area included in group #0 by accessing the storage area included in group #0, and then reads the gradation data from each storage area included in group #1 by accessing the storage area included in group #1. The order of accessing groups #0 and #1 may be reversed. In dynamic mode 1, data selector 5 sequentially accesses the storage areas included in groups #0 to #3, and reads the gradation data from each storage area included in the group in each group. Similarly, in dynamic modes 2 and 3, data selector 5 sequentially accesses the storage areas included in groups #0 to #7, and reads the gradation data from each storage area included in the group in each group.

Every time the gradation data is read from register 3, data selector 5 outputs the gradation data to pulse signal-generating circuit 9.

According to the number of selection wires used in the operation mode designated by the operation mode signal, dynamic control circuit 6 decides the period during which the power is supplied to each selection wire such that power supply timing varies. Dynamic control circuit 6 generates a pulse signal in each selection wire in order to control an LED drive circuit (not illustrated). The LED drive circuit is arranged between the selection wire and the constant-voltage source to switch whether the power supplied from the constant-voltage source to the LED through the selection wire is switched. Dynamic control circuit 6 outputs the pulse signal to the output pin connected to the corresponding LED drive circuit.

For example, in the case that one of dynamic modes 1 to 3 is applied to the operation mode, dynamic control circuit 6 decides the period and timing in which the power is supplied in each selection wire. Dynamic control circuit 6 generates the pulse signal in each output pin that is connected to the LED drive circuit connected to the selection wire used in the operation mode. The pulse signal has a pulse width equal to the period during which the power is supplied. The pulse signal has a potential Von for the pulse and has a potential Voff for the period during which the power is not supplied. Dynamic control circuit 6 outputs the pulse signal to the LED drive circuit connected to the output pin. The timing in which the pulse is output varies in each pulse signal output to the individual LED drive circuit such that the power is sequentially supplied to the selection wire at each given cycle. The given cycle is set to such a period that the player cannot visually perceive flicker of the LED, for example, 10 ms or less. The given cycle may vary according to the applied operation mode. For example, the given cycle may be decided with respect to the LED drive circuit connected to one of the output pins such that the pulse width of the potential Von is 1 ms. In this case, the given cycle is 2 ms in dynamic mode 1 in which the 2 selection wires are used, and the given cycle is 8 ms in dynamic mode 3 in which the 8 selection wires are used.

Alternatively, the given cycle may be kept constant irrespective of the operation mode. For example, in the case that the given cycle is 8 ms, the pulse signal having the pulse width of 4 ms is output to the LED drive circuit connected to each of the 2 output pins in dynamic mode 1. On the other hand, in dynamic mode 3, the pulse signal having the pulse width of 1 ms is output to the LED drive circuit connected to each of the 8 output pins.

For example, dynamic control circuit 6 includes a processor and a nonvolatile memory circuit in order to generate the pulse signal for each LED drive circuit. For example, the operation mode and a dynamic control reference table expressing a relationship between the pulse width and the pulse generation timing in each output pin connected to the LED drive circuit are stored in the memory circuit. By referring to the dynamic control reference table, the processor included in dynamic control circuit 6 decides the pulse width and the generation timing for each LED drive circuit according to the applied operation mode. The processor generates the pulse signal for each LED drive circuit according to the decided pulse width and generation timing.

Dynamic control circuit 6 outputs the signal which does not have the pulse of the potential Von, namely, has the pulse of the constant potential Voff, to the output pin that is not connected to the LED drive circuit.

For example, each LED drive circuit includes a switching element (not illustrated). For example, the switching element is a field effect transistor, a drain of the field effect transistor is connected to the constant-voltage source (not illustrated), and a source is connected to the selection wire. A gate that is of a switching terminal of the field effect transistor is connected to output pins OUTC1 to OUTC4 or shared pins OUTU1 to OUTU4.

For example, the pulse signal for each selection wire is received from dynamic control circuit 6 while set according to the operation mode, and the pulse signal for each selection wire is input to the switching terminal of the switching element included in the LED drive circuit connected to the selection wire. While the pulse signal has the predetermined potential Von, the LED drive circuit electrically connects the corresponding selection wire and the constant-voltage source to supply the power from the constant-voltage source to the LED connected to the selection wire. On the other hand, when the pulse signal has the potential Voff different from the potential Von, the LED drive circuit does not electrically connect the corresponding selection wire to the constant-voltage source.

For example, gradation control circuit 7 includes switching circuits (not illustrated) as many as the maximum number of control wires that can simultaneously be controlled (in one or more embodiments of the present invention, 24 control wires). The 20 switching circuits are directly connected to output pins OUTS1 to OUTS20. The remaining 4 switching circuits are connected to 4 shared pins OUTU1 to OUTU4 through output switching circuit 10. Each switching circuit includes the switching element such as the transistor and a variable resistor (not illustrated) that is directly connected to the output pin through the switching element.

For example, the pulse signal for each control wire is received from pulse signal-generating circuit 9 while set according to the operation mode, and the pulse signal for each control wire is input to the switching terminal of the switching element corresponding to the output pin connected to the control wire. In the case that the switching circuit includes the transistor that is of the switching element, for example, the switching terminal is the base of the transistor. While the pulse signal has the predetermined potential Von, the switching circuit grounds the control wire connected to the corresponding output pin through the variable resistor such that a current having a current value controlled by a resistance value of the variable resistor is passed through the LED connected to the control wire. On the other hand, when the pulse signal has the potential Voff different from the potential Von, the switching circuit does not ground the control wire connected to the corresponding output pin such that the current is not passed through the LED connected to the control wire. Therefore, gradation control circuit 7 adjusts the emission amount of the LED connected to each control wire by the PWM system.

For example, current-setting circuit 8 adjusts the resistance value of the variable resistor included in each switching circuit of gradation control circuit 7 according to a current-setting signal received from the performance CPU. For example, the current-setting signal is expressed by a 3-bit length to specify the resistance value of the variable resistor at 8 levels. When receiving the current-setting signal, current-setting circuit 8 adjusts the resistance value of each switching circuit to the value specified by the current-setting signal. Therefore, light source control device 1 can uniformly adjust the emission amounts of the LEDs.

For example, in the case that the game machine is in a waiting state (that is, in the case that the player who plays the game machine does not present), by setting the resistance value of the variable resistor to the maximum value of the 8 levels, light source control device 1 can uniformly decrease emission intensities of all the LEDs while the emission pattern of each LED is set to the pattern corresponding to the performance. Therefore, light source control device 1 can reduce the power consumption of the LED in the waiting state while reducing a control load on the performance CPU.

In a modification, a fixed resistor may be used instead of the variable resistor in each switching circuit of gradation control circuit 7. In this case, the variable resistor is connected between the constant-voltage source and each switching circuit included in dynamic control circuit 6, and current-setting circuit 8 adjust the resistance value of the variable resistor according to the received current-setting signal.

Pulse signal-generating circuit 9 is a part of a period-setting unit. In order to control the emission amount of the LED by the PWM system, pulse signal-generating circuit 9 decides the period and timing in which the output pin connected to the control wire is energized in the operation mode according to the operation mode of which pulse signal-generating circuit 9 is notified by mode selection circuit 4 and the gradation data received from data selector 5. Pulse signal-generating circuit 9 has a pulse width equal to the energized period. Pulse signal-generating circuit 9 generates the pulse signal in each output pin connected to the control wire. The pulse signal has the potential Von for the pulse, and the pulse signal has the potential Voff for the period during which the energization is not performed. Pulse signal-generating circuit 9 outputs the pulse signal to the switching circuit of gradation control circuit 7 corresponding to the output pin.

As described above, the gradation data expresses a ratio of the period during which the LED is energized to the period during which the power is supplied to the selection wire connected to the LED corresponding to the gradation data. Accordingly, for example, when the gradation data has the maximum value (255), pulse signal-generating circuit 9 equalizes the energization period of the control wire connected to the LED corresponding to the gradation data to the period during which the power is supplied to the selection wire connected to the LED. When the gradation data is a half (that is, 127) of the maximum value, pulse signal-generating circuit 9 sets the energization period of the control wire connected to the LED corresponding to the gradation data to a half of the period during which the power is supplied to the selection wire connected to the LED.

In the case that the static mode is applied to the operation mode, pulse signal-generating circuit 9 outputs the pulse to the switching circuit of gradation control circuit 7 corresponding to the output pin connected to the control wire in each predetermined cycle. The pulse has the pulse width in which the predetermined cycle is multiplied by the ratio specified by the gradation data for the LED connected to the control wire. In this case, the predetermined cycle is also set to such a period that the player cannot visually perceive the flicker of the LED, for example, 10 ms or less.

Pulse signal-generating circuit 9 generates the pulse signal for each LED. The pulse signal turns on the switching circuit of gradation control circuit 7 corresponding to the output pin connected to the control wire only in the period during which the control wire connected to the LED is energized. Therefore, for example, the operation mode and the gradation control reference table expressing the relationship between the pulse width and the pulse generation timing in the case of the maximum emission amount in each switching circuit corresponding to the output pin connected to the selection wire are stored in the memory circuit of pulse signal-generating circuit 9. The processor included in pulse signal-generating circuit 9 refers to the gradation control reference table to decide the pulse width and the pulse generation timing of the maximum emission amount with respect to each switching circuit corresponding to the applied operation mode. The processor decides each pulse width by multiplying the pulse width of the maximum emission amount by the ratio corresponding to the gradation data of the LED connected to each control wire. The processor generates the pulse signal for each switching circuit according to the decided pulse width and pulse generation timing.

Pulse signal-generating circuit 9 outputs the signal, which does not have the pulse of the potential Von, namely, has the pulse of the constant potential Voff, to the switching circuit of gradation control circuit 7 corresponding to the output pin that is not connected to the control wire.

Figure 5:
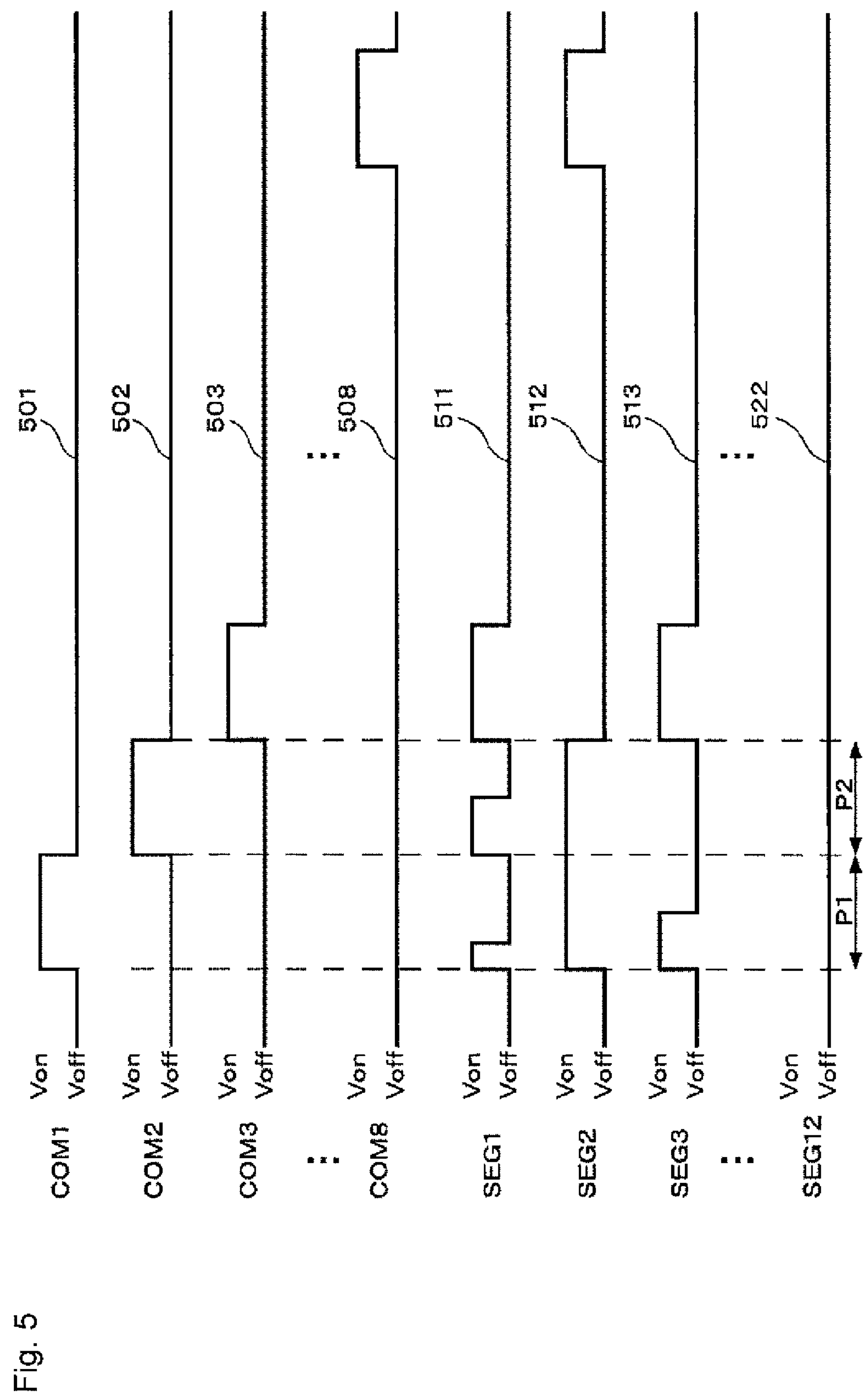
FIG. 5 is a timing chart illustrating an example of pulse signals applied to a switching circuit of a dynamic control circuit or a gradation control circuit, the dynamic control circuit or the gradation control circuit being connected to each selection wire and each control wire in wiring of FIG. 1A.

FIG. 5 is a timing chart illustrating an example of the pulse signal applied to the switching circuit of the LED drive circuit or gradation control circuit. The LED drive circuit or the gradation control circuit is connected to each selection wire and each control wire in the wiring of FIG. 1A.

In FIG. 5, waveforms 501 to 508 express signal waveforms, which are output from dynamic control circuit 6 and applied to the LED drive circuits connected to output pins OUTC1 to OUTC4 and shared pins OUTU1 to OUTU4. It is assumed that output pins OUTC1 to OUTC4 and shared pins OUTU1 to OUTU4 output the pulse signals to the LED drive circuits connected to selection wires COM1 to COMB. Waveforms 511 to 522 express signal waveforms applied to the switching circuits of gradation control circuit 7 corresponding to output pins OUTS1 to OUTS12. It is assumed that output pins OUTS1 to OUTS12 are connected to control wires SEG1 to SEG12. In FIG. 5, a horizontal axis of each signal waveform indicates time, and a vertical axis indicates the potential of the pulse signal. In the vertical axis, Von indicates the potential at which the power is supplied to the LED drive circuit from the constant-voltage source, or the potential at which the switching circuit of gradation control circuit 7 passes the current. On the other hand, Voff indicates the potential at which the power is not supplied to the LED drive circuit from the constant-voltage source, or the potential at which the switching circuit of gradation control circuit 7 does not pass the current.

As illustrated in signal waveforms 501 to 508, the pulse having the potential Von is alternately applied to selection wires COM1 to COM8 such that the power is supplied to only one of the selection wires in the ascending order of the LED drive circuits connected to selection wires COM1 to COM8. For example, the pulse width is 1 ms. Accordingly, in this case, the power is supplied once to each of selection wires COM1 to COM8 in each cycle of 8 ms.

On the other hand, as illustrated in signal waveforms 511 to 522, while the pulse is applied to the LED drive circuit corresponding to selection wire COMy (y=1, 2, . . . , 8), each control wire can be energized only in the period corresponding to the emission intensity of the LED connected to selection wire COMy and each of control wires SEG1 to SEG12 by the PWM control. For example, in period P1 during which the pulse is applied to the LED drive circuit connected to selection wire COM1, the pulse having the potential Von is applied to the switching circuit of gradation control circuit 7 connected to control wire SEG1 only in the period of a quarter of period P1. Accordingly, the emission amount of LED 20-1 connected to selection wire COM1 and control wire SEG1 becomes the quarter of the maximum emission amount. Similarly, in period P1, the pulse having the potential Von is applied to the switching circuits connected to control wires SEG2 and SEG3 in the period equal to period P1 and a half of period P1, respectively. Therefore, the emission amount of LED 20-2 connected to selection wire COM1 and control wire SEG2 becomes the maximum emission amount, and the emission amount of LED 20-3 connected to selection wire COM1 and control wire SEG3 becomes the half of the maximum emission amount. In period P1, the pulse is not applied to the switching circuit connected to control wire SEG12, but the switching circuit is always kept at the potential Voff. Accordingly, LED 20-12 connected to selection wire COM1 and control wire SEG12 does not emit the light. Similarly, in period P2 during which the pulse is applied to the LED drive circuit connected to selection wire COM2, the pulse having the potential Von is applied to the switching circuit of gradation control circuit 7 connected to control wire SEG1 only in the period of a half of period P2. Accordingly, the emission amount of LED 20-13 connected to selection wire COM2 and control wire SEG1 becomes the half of the maximum emission amount.

Output switching circuit 10 switches shared pins OUTU1 to OUTU4 to dynamic control circuit 6 or gradation control circuit 7 according to the operation mode of which output switching circuit 10 is notified by mode selection circuit 4. Therefore, for example, output switching circuit 10 includes 4 two-input one-output switches. In each switch, an output end is connected to one of shared pins OUTU1 to OUTU4, one of two input ends is connected to dynamic control circuit 6, and the other input end is connected to the switching circuit of gradation control circuit 7. In the case that dynamic mode 1 in which the 8 selection wires are used is applied to the operation mode, output switching circuit 10 changes over each switch such that dynamic control circuit 6 is connected to shared pins OUTU1 to OUTU4. On the other hand, in the case that the operation mode except dynamic mode 1 is applied, output switching circuit 10 changes over each switch such that the switching circuits of gradation control circuit 7 are connected to shared pins OUTU1 to OUTU4.

As described above, in the light source control device, the plurality of LEDs can be controlled by both the static control system and the dynamic control system by setting the period during which the power is supplied to each selection wire according to the operation mode and the period during which each control wire is energized. In the light source control device, regardless of which of the static control system and the dynamic control system may be applied, the emission amount of each LED can be controlled using the command of the same command system. Therefore, the calculation load of the performance CPU can be reduced in the light source control device. In the light source control device, some of the plurality of output pins are connected to one of the dynamic control circuit and the gradation control circuit in the switching manner according to the applied operation mode, so that the increase of the number of output pins can be suppressed. In the register of the light source control device, the plurality of storage areas in each of which the gradation data is stored are grouped so as to each include storage areas of the greatest common factor of the number of control wires that are simultaneously controlled in the operation modes. Therefore, the gradation data can efficiently be read in each operation mode.

The present invention is not limited to the above embodiments. For example, the LED is not necessarily used as the light source controlled by the light source control device. The light source may be one in which the emission intensity can be controlled by the PWM system.

In another modification, at least one of output pins OUTC1 to OUTC4 may be connected to the LED drive circuit connected to the selection wire to which the power is supplied from constant-voltage source in the static mode. In this case, dynamic control circuit 6 may output the signal that always has the potential Von to the output pin that is connected to the LED drive circuit connected to the selection wire used to supply the power from the constant-voltage source.

In still another modification, by sequentially receiving the operation mode signal designating the different operation mode from the performance CPU, light source control device dynamically may switch the operation mode applied according to the operation mode signal. Therefore, for example, particularly the number of selection wires that are simultaneously controlled can dynamically be switched. As a result, because the period during which the power is supplied to one selection wire is also changed, the emission amount of each LED can be changed without changing the gradation data. Depending on the selection wire, whether the power is supplied is switched by switching the operation mode. For example, in dynamic mode 2, the power is supplied to the selection wires corresponding to output pins OUTC3 and OUTC4. When the applied operation mode is switched to dynamic mode 1 or the static mode, the power is not supplied to the selection wires corresponding to output pins OUTC3 and OUTC4. Therefore, in the light source control device, the combination of the LED that emits the light and the LED that does not emit the light can be changed by switching the operation mode. In the light source control device, because the performance CPU only needs to switch the operation mode signal to be able to switch the emission pattern of the LED on the game machine, the simple unit can be provided to the calculation CPU for the case that the emission pattern or the emission amount is switched while the calculation load on the performance CPU is reduced.

The number of shared pins connected to the LED drive circuit or control wire is not limited to 4 according to the applied operation mode. For example, the number of shared pins can be set to the number in which the minimum number of control wires is subtracted from the maximum number of control wires that can simultaneously be controlled. In one or more embodiments of the present invention, the 24 control wires can simultaneously be controlled for the static mode and dynamic modes 1 and 2, and 12 control wires can simultaneously be controlled for dynamic mode 3. Therefore, the number of shared pins may be 12. In the case that the selection wire is connected to the shared pin, output switching circuit 10 may output one pulse signal, which is output from dynamic control circuit 6, from the plurality of shared pins. Therefore, a degree of wiring freedom can be enhanced because the plurality of output pins can output the pulse signal expressing the power supply in the same timing without increasing the number of output pins.

Like the case that dynamic mode 3 is not set in one or more embodiments of the present invention, the shared pin and the output switching circuit may be eliminated in the case of the sufficient number of output pins specially prepared for the selection wire.

In still another modification, the operation mode possessed by the light source control device is not limited to one or more embodiments of the present invention. For example, the light source control device may possess a mixed mode as one of the operation modes. In the mixed mode, the light source control device can control some of the plurality of light sources by the static control system, and control the remaining light sources by the dynamic control system. For example, in the mixed mode, the light source control device can control the LEDs of 48 systems connected to the 4 selection wires and 12 control wires by the dynamic control system while controlling the LEDs of 12 systems by the static control system. In this case, 12 output pins of 20 output pins OUTS1 to OUTS20 and the switching circuits of gradation control circuit 7 connected to the 12 output pins are used in the static control. On the other hand, the remaining 8 output pins of 20 output pins OUTS1 to OUTS20, the 4 shared pins, and the switching circuits of gradation control circuit 7 connected to the 8 output pins and 4 shared pins are used in the dynamic control. The power is always supplied to the static control selection wire from the constant-voltage source, and the pulse signal issuing an instruction to sequentially supply the power in a given cycle is output to the LED drive circuit connected to the dynamic control selection wire through each of output pins OUTC1 to OUTC4.

In still another modification, the operation mode signal may be included in the control command. In this case, for example, the operation mode signal is stored as a part of the control data in the control command. Interface circuit 2 extracts the operation mode signal from the control command, and transfers the operation mode signal to mode selection circuit 4.

In still another modification, the switching circuit included in the gradation control circuit for each control wire may be provided independently of the light source control circuit. In this case, the switching terminal of the switching circuit is connected to output pins OUTS1 to OUTS20 or shared pins OUTU1 to OUTU4. The pulse signal that is generated by pulse signal-generating circuit 9 while corresponding to each control wire is output to the output pin or shared pin connected to the switching terminal of the switching circuit corresponding to the control wire.

The light source control device of one or more embodiments of the present invention or modifications may be mounted on the game machine such as the pachinko machine and the slot machine.

Figure 6:
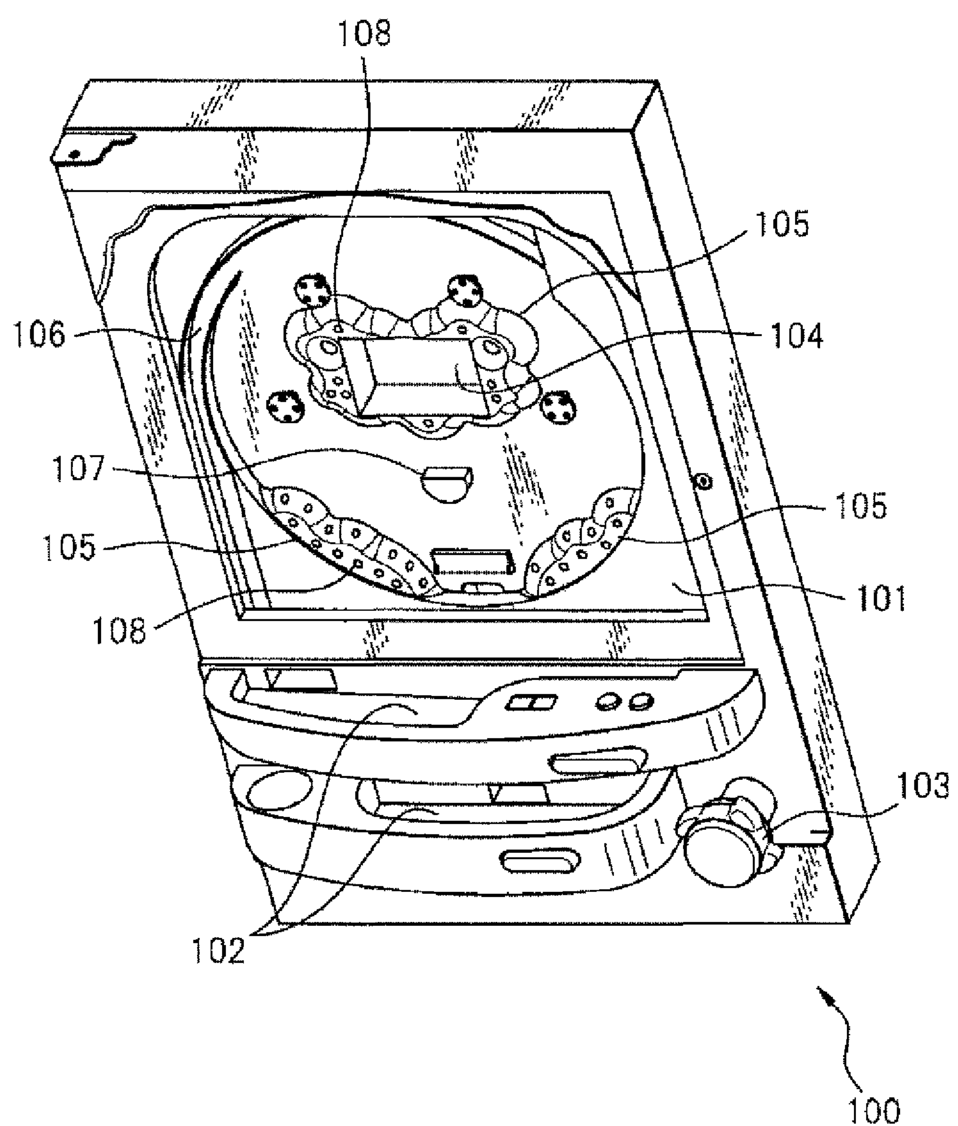
FIG. 6 is a schematic perspective view illustrating a pachinko machine including the light source control device according to one or more embodiments of the present invention.
Figure 7:
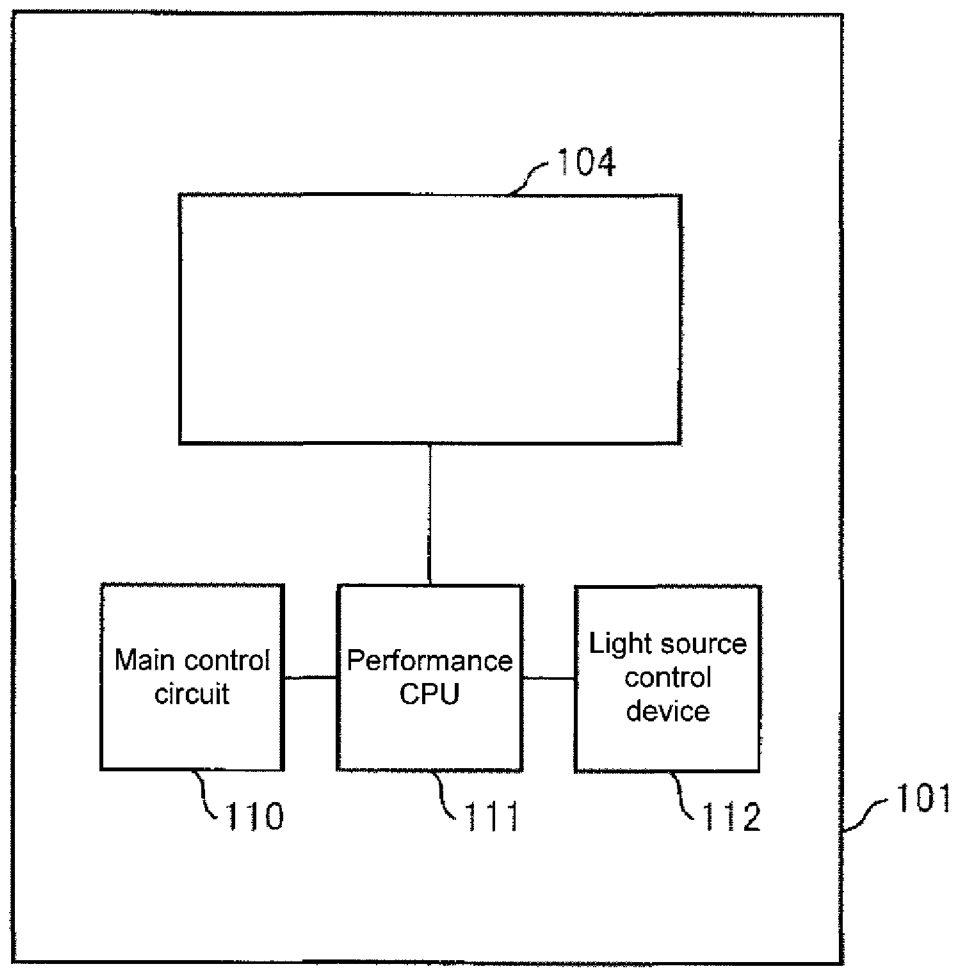
FIG. 7 is a schematic rear view illustrating a pachinko machine including the light source control device according to one or more embodiments of the present invention.

FIG. 6 is a schematic perspective view of pachinko machine 100 including the light source control device of one or more embodiments of the present invention or modifications. FIG. 7 is a schematic rear view of pachinko machine 100. As illustrated in FIG. 6, pachinko machine 100 includes game board 101 that is of the game machine body provided in most of a region from an upper portion to a central portion, ball-receiving unit 102 that is provided below game board 101, operation unit 103 that includes a handle, a display device 104 that is provided in the substantial center of game board 101, and accessory unit 105 that is arranged in a periphery of display device 104 and a lower portion of game board 101 in the front surface of game board 101 and is used for a performance in the game. Rail 106 is provided in a side portion of game board 101. Many obstacle nails (not illustrated) and at least one winning device 107 are provided on game board 101.

Operation unit 103 shoots a game ball with a predetermined force from a shooting device (not illustrated) according to a turning amount of the handle operated by the player. The shot game ball moves upward along rail 106 and drops among the many obstacle nails. When a sensor (not illustrated) detects that the game ball enters winning device 107, main control circuit 110 provided in the rear surface of game board 101 pays the predetermined number of game balls corresponding to winning device 107 entered by the game ball to ball-receiving unit 102 through a ball put-out device (not illustrated). Main control circuit 110 causes display device 104 to display various images through performance CPU 111 provided in the rear surface of game board 101.

A plurality of LEDs 108 are arranged in accessory unit 105, and each LED 108 is controlled by light source control device 112 of one or more embodiments of the present invention provided in the rear surface of game board 101. In addition to accessory unit 105, the LED may be placed in the front surface of game board 101 or the periphery of game board 101.

In order to notify light source control device 112 that each LED 108 arranged in game board 101 is controlled by the static control system or the dynamic control system, performance CPU 111 generates the operation mode signal specifying the applied operation mode, and transmits the operation mode signal to light source control device 112. It is only necessary to transmit the operation mode signal to light source control device 112 at a time point when pachinko machine 100 is started up, but it is not necessary for performance CPU 111 to transmit the operation mode signal again during the operation of pachinko machine 100.

Based on a state signal indicating the game state transmitted to performance CPU 111 from main control circuit 110, performance CPU 111 decides the LED to be lit in LEDs 108 and the emission intensity of the LED to be lit, and generates the control command according to the decision. Performance CPU 111 outputs the generated control command to light source control device 112. For example, before the game ball enters winning device 107, performance CPU 111 sets the gradation control bit included in the control data of the control command to '1', and roughly sets the emission intensity of each LED. On the other hand, when the game ball entering winning device 107 is detected, and main control circuit 110 inputs the state signal indicating that the game ball enters winning device 107 to performance CPU 111, performance CPU 111 sets the gradation control bit to '0' and finely decides the emission intensity of each LED. In the case that pachinko machine 100 is in the waiting state, performance CPU 111 generates the current-setting signal such that the emission luminance of each LED 108 is lowered to a half of that in the playing state, for example, such that the resistance value of a variable resistor of the gradation control circuit in the waiting state is set to two times that in the playing state, and performance CPU 111 outputs the current-setting signal to light source control device 112. The light source control device flickers each LED with the predetermined emission intensity according to the control command and the current-setting signal.

It is noted that those skilled in the art can make various changes according to an implementation form without departing from the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 light source control device
2 interface circuit
3 register
4 mode selection circuit
5 data selector
6 dynamic control circuit
7 gradation control circuit
8 current-setting circuit
9 pulse signal-generating circuit
10 output switching circuit
OUTC1 to OUTC4, OUTS1 to OUTS20 output pin
OUTU1 to OUTU4 shared pin
20-1 to 20-96 LED
COM1 to COM8 selection wire
SEG1 to SEG24 control wire
100 pachinko machine
101 game board
102 ball-receiving unit
103 operation unit
104 display device
105 accessory unit
106 rail
107 winning device
108 decoration device
110 main control circuit
111 performance CPU
112 light source control device

The invention claimed is:

1. A light source control device configured to control a plurality of light sources provided in a game machine, an anode of each of the plurality of light sources being connected to one of at least one first signal wire, a cathode being connected to one of a plurality of second signal wires, the light sources differing from each other in a set of the connected first signal wire and second signal wire, the light source control device comprising:

a plurality of first output pins;
a plurality of second output pins;
an interface;
a storage;
a dynamic controller;
a period-setting unit; and
a gradation controller, wherein each of the plurality of first output pins is provided in corresponding one of the at least one first signal wire, wherein the plurality of first output pins connect to a drive circuit that switches whether power is supplied to the first signal wire, wherein the plurality of second output pins connect with one of the plurality of second signal wires;

wherein the interface comprises gradation data for each of the plurality of light sources, wherein the gradation data specifies an emission amount of one of the plurality of light sources using a plurality of bits, wherein the interface receives a serially-transmitted control command and an operation mode signal designating an operation mode applied in a plurality of operation modes, wherein the operation modes differ from each other in a combination of the number of first signal wires and the number of second signal wires, wherein the storage stores each piece of gradation data, wherein the dynamic controller decides a first period such that the first signal wires differ from each other in timing of supplying the power according to the number of first signal wires used in the operation mode designated by the operation mode signal, wherein the dynamic controller outputs a signal to each first output pin connected to the drive circuit in the plurality of first output pins, wherein the signal causes each first output pin to supply the power to the first signal wire during the first period, wherein the drive circuit is connected to the first signal wire used in the designated operation mode, wherein the period-setting unit sets a second period to each of the plurality of second signal wires used in the designated operation mode, the second period during which the light source is able to be energized according to the emission amount expressed in the gradation data corresponding to the light source while the first period is set to the first signal wire to which the anode of the light source is connected, wherein the anode of the light source is connected to the second signal wire in the plurality of light sources, wherein the gradation controller is connected to the plurality of second output pins, and wherein the gradation controller energizes the light source during the second period of the light source connected to the second signal wire in the plurality of light sources with respect to each second output pins connected to the second signal wire used in the designated operation mode.

2. The light source control device according to claim 1, further comprising:

an output switching circuit that connects at least one of the plurality of second output pins to one of the gradation controller and the dynamic controller according to the operation mode signal.

3. The light source control device according to claim 2, further comprising:

a data selector that groups a plurality of storage areas into groups each comprised of storage areas of the greatest common factor of the number of second signal wires specified by the plurality of operation modes, wherein the data selector reads the gradation data from the storage area comprised in the group and transmit the gradation data to the period-setting unit in each group corresponding to the operation mode designated in the operation mode signal, wherein the storage comprises the storage areas as many as a maximum value of the number of controllable light sources, and wherein each of the storage areas stores one piece of the gradation data.

4. The light source control device according to claim 1, further comprising:

a data selector that groups a plurality of storage areas into groups each comprised of storage areas of the greatest common factor of the number of second signal wires specified by the plurality of operation modes, wherein the data selector reads the gradation data from the storage area comprised in the group and transmit the gradation data to the period-setting unit in each group corresponding to the operation mode designated in the operation mode signal, wherein the storage comprises the storage areas as many as a maximum value of the number of controllable light sources, and wherein each of the storage areas stores one piece of the gradation data.

5. A game machine comprising:

a game machine body;

a plurality of light sources that are arranged in a front surface of the game machine body;

a light source control device that controls the plurality of light sources; and a performance controller that controls performance according to a state of a game, wherein an anode of each of the plurality of light sources is connected to one of a plurality of first signal wires, wherein a cathode is connected to one of a plurality of second signal wires, wherein the light sources differ from each other in a set of the connected first signal wire and second signal wire, wherein the performance controller generates a control command according to the state of the game, wherein the control command comprises gradation data for each of the plurality of light sources, wherein the gradation data specifies an emission amount of one of the plurality of light sources using a plurality of bits, wherein the performance controller serially transmits the control command to the light source control device, and transmits an operation mode signal to the light source control device, wherein the operation mode signal designates an applied operation mode from a plurality of operation modes that differ from each other in a combination of the number of first signal wires and the number of second signal wires, and wherein the light source control device comprises:

a plurality of first output pins;

a plurality of first output pins;

a plurality of second output pins;

an interface;

a storage;

a dynamic controller;

a period-setting unit; and a gradation controller, wherein each of the plurality of first output pins is provided in corresponding one of the at least one first signal wire, wherein the plurality of first output pins connect to a drive circuit that switches whether power is supplied to the first signal wire, wherein the plurality of second output pins connect with one of the plurality of second signal wires, wherein the interface receives the control command and the operation mode signal, wherein the storage stores each piece of gradation data, wherein a dynamic controller decides a first period such that the first signal wires differ from each other in timing of supplying the power according to the number of first signal wires used in the operation mode designed by the operation mode signal, wherein a dynamic controller outputs a signal to each first output pin connected to the drive circuit in the plurality of first output pins, wherein the signal causes each first output pin to supply the power to the first signal wire during the first period, wherein the drive circuit is connected to the first signal wire used in the designation operation mode, wherein the period-setting unit sets a second period to each of the plurality of second signal wires used in the designated operation mode, the second period during which the light source is able to be energized according to the emission amount expressed in the gradation data corresponding to the light source while the first period is set to the first signal wire to which the anode of the light source is connected, wherein the anode of the light source being connected to the second signal wire in the plurality of light sources, wherein a gradation controller that is connected to the plurality of second output pins, and wherein the gradation controller energizes the light source during the second period of the light source connected to the second signal wire in the plurality of light sources with respect to each second output pins connected to the second signal wire used in the designated operation mode.

* * * * *